United States Patent Office 2,934,570
Patented Apr. 26, 1960

2,934,570
INTERMEDIATES FOR SYNTHESIS OF ARACHIDONIC ACID

Moses Wolf Goldberg, Upper Montclair, and Albert Israel Rachlin, Hackensack, N.J., assignors to Hoffmann-La Roche Inc., Nutley, N.J., a corporation of New Jersey No Drawing. Application December 11, 1958
Serial No. 779,569
6 Claims. (Cl. 260—633)

This invention relates to novel methods and novel intermediates for the synthesis of one of the essential fatty acids, of nutritional importance. More particularly, it relates to novel processes and intermediates for the preparation of arachidonic acid.

A comprehensive embodiment of the invention may be visualized from the following diagrammatic flow sheet, wherein important stages and intermediate products are represented by sequences of structural formulas.

As will be apparent from the flow sheet, the invention in one of its aspects provides novel methods and novel intermediates for making arachidonic acid (XI) from two novel starting materials, i.e. 1-bromo-9-chloro-2,5-nonadiyne (VI) and 1,4-decadiyne (VIII). In this aspect, the invention provides a process for the preparation of arachidonic acid which comprises condensing 1,4-decadiyne with 1-bromo-9-chloro-2,5-nonadiyne by a metal-organic reaction, thereby forming 1-chloro-4,7-10,13-nonadecatetrayne; semihydrogenating all acetylenic bonds in the latter, thereby forming 1-chloro-4,7,10,13-nonadecatetraene; and carbonating the latter, thereby forming arachidonic acid.

In another of its aspects, the invention provides novel methods and intermediates for the preparation of the reactant 1-bromo-9-chloro-2,5-nonadiyne referred to above. In this aspect, the invention provides a process for the preparation of 1-bromo-9-chloro-2,5-nonadiyne which comprises condensing 1-bromo-3-chloropropane by a metal-organic reaction with hydroxy-protected pro-

FLOW SHEET

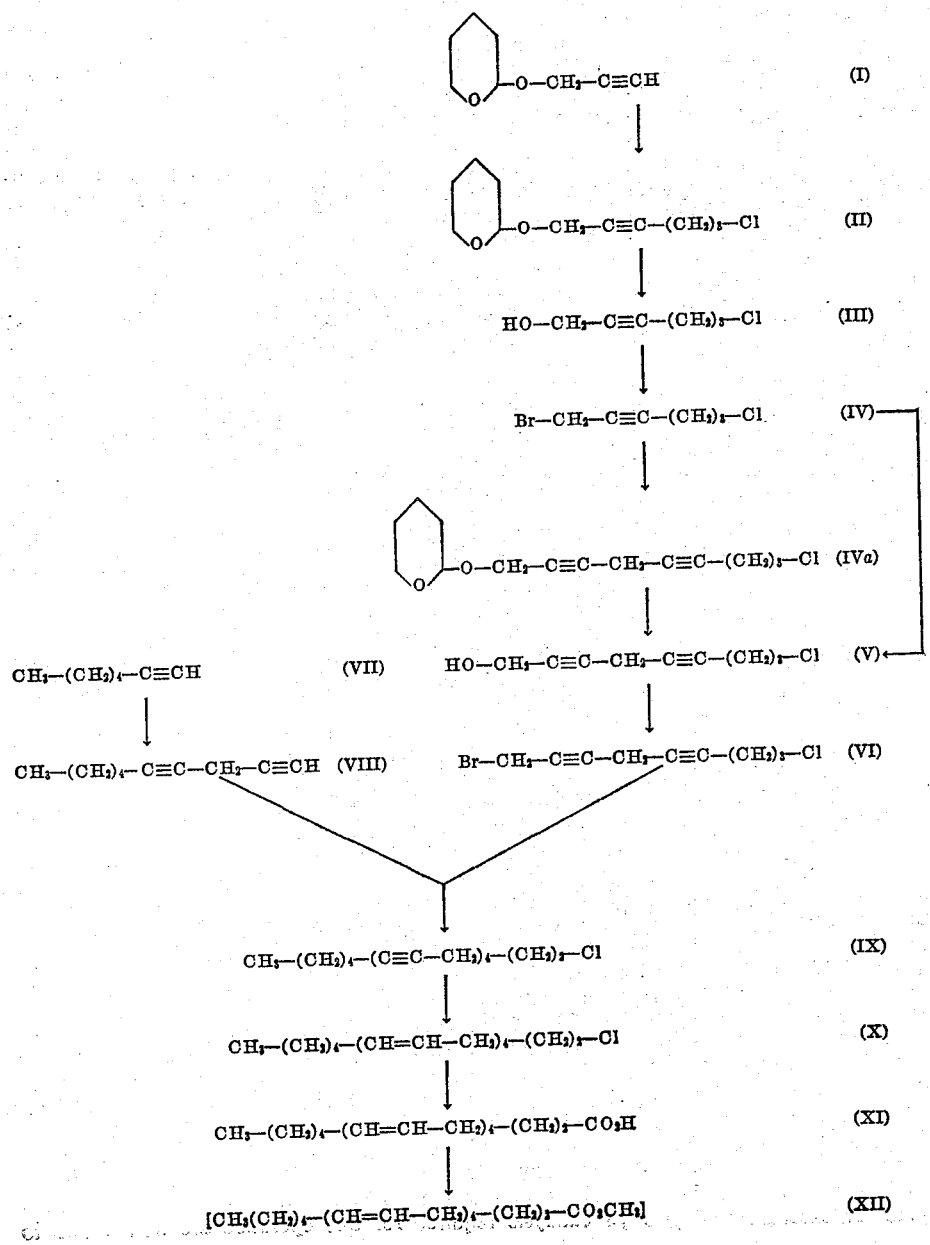

pargyl alcohol, for example 2-propargyloxytetrahydropyran (I), thereby forming hydroxy-protected 1-hydroxy-6-chloro-2-hexyne, for example 1-(tetrahydro-2-pyranoxy)-6-chloro-2-hexyne (II); splitting off the protective or blocking group from the latter, thereby forming 1-hydroxy-6-chloro-2-hexyne (III); reacting the latter with a brominating agent, thereby forming 1-bromo-6-chloro-2-hexyne (IV); condensing the latter by a metal-organic reaction with propargyl alcohol (or hydroxy-protected propargyl alcohol) thereby forming 1-hydroxy-9-chloro-2,5-nonadiyne (V) [or corresponding hydroxy-protected 1-hydroxy-9-chloro-2,5-nonadiyne, e.g. 1-tetrahydro-2-pyranoxy)-9-chloro-2,5-nonadiyne (IVa)—in which case the next step comprises splitting off the protective group to obtain free 1-hydroxy-9-chloro-2,5-nonadiyne (V)]; and reacting 1-hydroxy-9-chloro-2,5-nonadiyne with a brominating agent, thereby forming 1-bromo-9-chloro-2,5-nonadiyne (VI).

In still another of its aspects, the invention provides a novel process for making the reactant 1,4-decadiyne referred to above. In this aspect, the invention provides a process of making 1,4-decadiyne (VIII) which comprises reacting 1-heptyne (VII) with propargyl halide by a metal-organic reaction.

With reference now to the flow sheet as illustrating one specific embodiment of various aspects of the invention referred to above:

The first step or stage shown in the flow sheet, from (I) to (II), comprises the formation of hydroxy-protected 1-hydroxy-6-chloro-2-hexyne. As a species embodiment of the latter, the flow sheet discloses 1-(tetrahydro-2-pyranoxy)-6-chloro-2-hexyne, and refers to a process of making the same by condensing 1-bromo-3-chloropropane by a metal-organic reaction with 2-propargyloxytetrahydropyran. However, whereas tetrahydropyranyl is here referred to as a particular blocking or protective radical, those skilled in the art will appreciate that other protective or blocking radicals can be employed, i.e. that other hydroxy-protected propargyl alcohols can be employed, if desired, thereby producing other species of hydroxyl-protected 1-hydroxy-6-chloro-2-hexyne. The reaction of 2-propargyloxytetrahydropyran and 1-bromo-3-chloropropane is conveniently effected by a metal-organic reaction, e.g. by converting the hydroxyl-protected propargyl alcohol to a derivative thereof in which the acetylenic hydrogen is replaced by a metal, the resulting metal derivative then being condensed with 1-chloro-3-bromopropane by splitting out metal bromide. A convenient mode of execution comprises reacting 2-propargyloxytetrahydropyran with lithium amide in liquid ammonia and condensing the resulting lithium derivative in the liquid ammonia medium with 1-bromo-3-chloropropane.

The second step shown in the flow sheet, from (II) to (III), comprises splitting off the blocking or protective group from the intermediate obtained in the first step. In the case of 1-(tetrahydro-2-pyranoxy)-6-chloro-2-hexyne, this operation is conveniently effected by acid-catalyzed alcoholysis, for example by refluxing the blocked compound with methanol in the presence of p-toluenesulfonic acid. By removal of the protective group, the desired free 1-hydroxy-6-chloro-2-hexyne is obtained.

The third stage shown in the flow sheet, from (III) to (IV), comprises the replacement of the hydroxyl group in intermediate (III) by bromine. This can be effected by conventional methods, by reaction with a brominating agent. A convenient mode of execution comprises reacting 1-hydroxy-6-chloro-2-hexyne with phosphorus tribromide in an inert solvent. Other conventional brominating agents, e.g. hydrobromic acid, thionyl bromide, and the like can be employed, if desired.

The next succeeding step in the overall process shown in the flow sheet comprises converting 1-bromo-6-chloro-2-hexyne to 1-hydroxy-9-chloro-2,5-nonadiyne. This can be done directly [as shown in the flow sheet from (IV) to (V)] by reacting 1-bromo-6-chloro-2-hexyne with propargyl alcohol; or can be accomplished by a two-stage process [shown in the flow sheet as (IV) to (IVa) to (V)] by reacting 1-bromo-6-chloro-2-hexyne with hydroxy-protected propargyl alcohol, thereby forming hydroxy-protected 1-hydroxy-9-chloro-2,5-nonadiyne (IVa), and splitting off the blocking or protective group from the latter. In the event that free propargyl alcohol is employed as a reactant, a convenient mode of execution comprises reacting propargyl alcohol with somewhat more than twice its molar proportion of a Grignard reagent in an inert organic solvent medium containing sufficient tetrahydrofuran to render soluble the resulting magnesium derivative of the propargyl alcohol, whereby one molar proportion of the Grignard reagent serves in effect to protect or block the hydroxyl group of the propargyl alcohol, the second molar proportion replacing the acetylenic hydrogen by magnesium halide. The resulting organomagnesium halide compound is then condensed with 1-bromo-6-chloro-2-hexyne in the same inert organic solvent medium, in the presence of cuprous halide. In the event that a protected propargyl alcohol is employed, for example 2-propargyloxytetrahydropyran, it is also convenient to work in an inert organic solvent medium containing sufficient tetrahydrofuran to solubilize the resulting magnesium-containing intermediate. In this case, only a slight excess over one molar proportion of Grignard reagent need be employed, inasmuch as the hydroxyl group in the propargyl alcohol reactant is already protected. It will be appreciated by those skilled in the art that although tetrahydropyranyl is referred to specifically herein as a protective group in connection with the conversion of (IV) to (V) via (IVa), other protective groups can be employed.

The next step shown in the flow sheet relates to the conversion of 1-hydroxy-9-chloro-2,5-nonadiyne to 1-bromo-9-chloro-2,5-nonadiyne. This step, like the similar conversion of (III) to (IV), is conveniently effected by reacting the hydroxy-containing reactant with a brominating agent. A convenient method comprises reacting 1-hydroxy-9-chloro-2,5-nonadiyne with phosphorus bromide in an inert organic solvent. Other brominating agents, e.g. hydrobromic acid, thionyl bromide, and the like, can be used.

A collateral step shown in the flow sheet relates to the conversion of 1-heptyne (VII) to 1,4-decadiyne (VIII). This reaction is advantageously effected by condensing 1-heptyne with propargyl halide by a metal-organic reaction. A convenient mode of execution comprises reacting 1-heptyne with a Grignard reagent in an inert organic solvent, such as ether, and condensing the resulting magnesium halide derivative of 1-heptyne with propargyl bromide in the same solvent in the presence of cuprous chloride.

The flow sheet shows a step of condensing (VI) with (VIII) to form (IX). In this stage of the synthesis, 1-bromo-9-chloro-2,5-nonadiyne is condensed with 1,4-decadiyne by a metal-organic reaction. A practical mode of execution comprises reacting 1,4-decadiyne with a Grignard reagent in an inert organic solvent, such as ether; and condensing the resulting magnesium halide derivative, in the same organic solvent and in the presence of cuprous chloride, with 1-bromo-9-chloro-2,5-nonadiyne. The bromine atom in the latter reacts preferentially to the chlorine atom, with formation of 1-chloro-4,7,10,13-nonadecatetrayne (IX).

In the next step of the synthesis, the last mentioned compound is semihydrogenated at each of the acetylenic linkages. The desired reaction is conveniently effected by reacting 1-chloro-4,7,10,13-nonadecatetrayne with about four molar proportions of elemental hydrogen in the presence of a hydrogenation catalyst having enhanced selectivity to catalyze the hydrogenation of an acetylenic bond only to the olefinic stage. Selective hydrogenation catalysts required for this operation are well known to those skilled in the art, being disclosed, for instance, in U.S. Patent 2,681,938, and in the corresponding publication by Lindlar in Helvetica Chimica Acta 35, 446 (1952). A convenient catalyst is the palladium-lead-calcium carbonate catalyst containing 5% palladium, disclosed at page 450 of the Lindlar publication referred to.

In the final stage of the synthesis of the invention, 1-chloro-4,7,10,13-nonadecatetraene is carbonated, thereby forming arachidonic acid. A specific mode of procedure comprises reacting 1-chloro-4,7,10,13-nonadecatetraene with activated magnesium, thereby forming 4,7,10,13-nonadecatetraen-1-yl magnesium chloride; and reacting the latter with carbon dioxide and hydrolyzing, thereby forming all-cis-5,8,11,14-eicosatetraenoic acid (arachidonic acid).

The flow sheet also shows an optional step of converting arachidonic acid (XI) to methyl arachidonate (XII). Such conversion is convenient for purposes of identification. The esterification referred to can be conveniently effected by reacting arachidonic acid in an inert organic solvent, such as ether, with diazomethane. Methyl arachidonate so prepared, from arachidonic acid produced according to the invention, does not differ materially from methyl arachidonate isolated from natural sources.

The invention is further disclosed in the following examples, which are illustrative but not limitative thereof. Temperatures are stated in degrees centigrade. All distillations were conducted under nitrogen, except those which were conducted at less than 0.001 mm. Hg. The yields stated are also merely illustrative.

EXAMPLE 1

1-(tetrahydro-2-pyranoxy)-6-chloro-2-hexyne (II)

Lithium amide was prepared by adding 10.5 g. (1.52 M) of lithium wire to 1500 cc. of liquid ammonia in a 3-liter flask fitted with an air-driven stirrer and a Dry Ice reflux condenser, which was connected to a tower containing powdered hydrated ferric nitrate and a blast of air were used to catalyze the initial reaction. 2-propargyloxytetrahydropyran (I) (210 g., 1.5 M) was added over 30 minutes with no external cooling. After stirring for an additional 15 minutes at the reflux temperature, the reaction mixture was cooled with a Dry Ice-acetone bath (minus 50°) and 236.5 g. (145 cc., 1.5 M) of 1-bromo-3-chloropropane was added dropwise over 45 minutes. The cooling bath was removed and stirring and refluxing were continued for 4½ hours after which time 75 g. of solid ammonium chloride was added. The Dry Ice condenser was replaced by an ordinary air condenser and the ammonia was allowed to evaporate into the fume hood. The reaction flask was cooled with an ice bath, 625 cc. of water followed by 750 cc. of ether were added and the mixture was stirred vigorously for 10 minutes. It was then filtered through a coarse sintered glass funnel covered with a mat of filter aid (Hyflo) and the solid matter was washed with ether. The two phase mixture was separated, the aqueous layer was extracted with 500 cc. of ether which was combined with the original organic phase and, after drying over sodium sulfate, the ether was stripped in vacuo. The dark orange-colored oil was dissolved in 750 cc. of petroleum ether (30–60°) and the resulting turbid solution was passed through a large column packed with a slurry of 600 g. of Woelm alumina (neutral grade) in petroleum ether. The column was washed with 1500 cc. of fresh petroleum ether and was allowed to drain completely. The combined eluates were evaporated in vacuo and the residual pale yellow oil was stripped under nitrogen through a 6″ Vigreux column, using a water pump. This operation was stopped when the vapor temperature, which reached a maximum of 80°/18 mm., started to fall and the distillation rate had decreased markedly. The receivers were changed and the distillation was continued in higher vacuum to give the product, 1-(tetrahydro-2-pyranoxy)-6-chloro-2-hexyne, as a colorless liquid, B.P. 110–114°/0.14 mm. Yield 166 g., 51%; $n_D^{25}=1.4842$.

The analytical sample distilled at 79°/0.025 mm., $n_D^{26}=1.4839$.

*Analysis.*—Calculated for $C_{11}H_{17}ClO_2$: C, 60.96; H, 7.91. Found: C, 60.71; H, 7.75.

In other experiments, yields up to 60% were obtained.

EXAMPLE 2

1-hydroxy-6-chloro-2-hexyne (III)

The combined eluates (after the alumina treatment), referred to in Example 1, were stripped of solvent and the residual 1-(tetrahydro-2-pyranoxy)-6-chloro-2-hexyne was dissolved in 1000 cc. of methanol, 10 g. of p-toluenesulfonic acid monohydrate was added, and the solution was refluxed for two hours. After cooling below 50°, 10 g. of sodium carbonate was added, the mixture was stirred for 10 minutes, and the volatile matter was distilled off in vacuo while heat was applied with an 80° water bath. The residue was partitioned between 800 cc. of ether and 800 cc. of water, the ether layer was washed with three 500 cc. portions of water, dried over sodium sulfate and activated charcoal (Norite A). After evaporating the ether, the residue was distilled under nitrogen from a Claisen flask to give 115 g. of liquid boiling from 52–91°/0.04 mm. This material was treated again for two hours with 600 cc. of methanol and 5 g. of p-toluenesulfonic acid monohydrate and worked up as before. Distillation gave 97.1 g. (48.8%) of pure 1-hydroxy-6-chloro-2-hexyne, B.P. 72–74°/0.04 mm.; $n_D^{26}=1.4870$.

The analytical sample distilled at 54°/0.025 mm.; $n_D^{26}=1.4868$.

*Analysis.*—Calculated for $C_6H_9ClO$: C, 54.35; H, 6.84. Found: C, 54.82; H, 6.97.

EXAMPLE 3

1-bromo-6-chloro-2-hexyne (IV)

A one liter flask equipped with a stirrer, thermometer, dropping funnel and a vent protected with a calcium chloride tube was charged with a solution of 81.7 g. (0.62 M) of 1-hydroxy-6-chloro-2-hexyne in 250 cc. of anhydrous ether containing 9.4 cc. of pyridine. The solution was cooled to 0° and, over a 20 minute period, 61.7 g. (21.7 cc., 0.23 M) of phosphorus tribromide was added. A white precipitate formed. The temperature was maintained at 0° during the addition and also for one hour longer. Then the temperature was allowed to rise to 20° over a 30 minute period and this temperature was maintained for 1½ hours after which time it was dropped at 0°. Cold hydrochloric acid (100 cc., 2 N) was added, the layers were separated, and the ether layer was washed in order, with 100 cc. of 2 N hydrochloric acid, 100 cc. of water, 100 cc. of 5% sodium carbonate solution and finally 100 cc. of water. After drying over sodium sulfate, the ether was stripped off in vacuo and the residue was distilled under nitrogen through a 6″ Vigreux column. The product, 1-bromo-6-chloro-2-hexyne, distilled as a colorless liquid, B.P. 40–43°/0.09 mm. Yield 84.9 g. (70%); $n_D^{26}=1.5234$. A short forerun and a short afterrun was discarded.

The analytical sample distilled at 38°/0.08 mm.; $n_D^{26}=1.5230$.

*Analysis.*—Calculated for $C_6H_8ClBr$: C, 36.68; H, 4.12. Found: C, 37.00; H, 4.33.

EXAMPLE 4

1-hydroxy-9-chloro-2,5-nonadiyne (V)

(a) *From 2-propargyloxytetrahydropyran.*— Ethyl magnesium bromide prepared from 10.1 g. (0.42 M) of magnesium turnings and 47.2 g. (33.3 cc., 0.43 M) of ethyl bromide in 250 cc. of anhydrous ether was decanted, in a nitrogen atmosphere, through a loose plug of glass wool directly into a 2-liter reaction flask. This flask was equipped with a precision ground stirrer, a pressure equalizing dropping funnel and a condenser, connected at the top, through a calcium chloride tube, to a line supplying dry nitrogen under a small pressure. The reaction mixture was diluted with 250 cc. of tetrahydrofuran which was added from the dropping funnel, and then, over 30 minutes, a solution of 53.6 g. (0.38 M) of 2-propargyloxytetrahydropyran in 125 cc. of tetrahydrofuran was added. Some heat was liberated. The reaction mixture was stirred and refluxed for two hours. It was then cooled somewhat, 0.77 g. of cuprous chloride was added, and refluxing was resumed for 15 minutes longer. Finally, a solution of 69.9 g. (0.36 M) of 1-bromo-6-chloro-2-hexyne in 125 cc. of tetrahydrofuran was added over 15 minutes, and the mixture was stirred and refluxed for 18 hours. After cooling, 250 cc. of saturated ammonium chloride solution and 350 cc. of ether were added, and the apparatus was transferred to a nitrogen atmosphere for the work up. The solid matter was vacuum filtered through a mat of filter aid (Hyflo) supported on a coarse sintered glass funnel, the organic layer was washed with three 200 cc. portions of saturated sodium chloride solution and finally, after drying over sodium sulfate, the solvent was stripped in vacuo.

The residual oil was dissolved in 375 cc. of ethanol, 4.5 g. of p-toluenesulfonic acid monohydrate was added, and the dark solution was refluxed for two hours. The solvent was stripped in vacuo and the residue was worked up in a nitrogen atmosphere. Water and ether (150 cc. of each) were added, the ether layer was washed with 140 cc. of 5% sodium bicarbonate solution, followed by two 140 cc. portions of 10% sodium chloride solution. After drying over sodium sulfate, the ether was stripped in vacuo and the product, 1-hydroxy-9-chloro-2,5-nonadiyne, was distilled under nitrogen through a 4" Vigreux column. After taking a short forerun which was rejected, the main cut distilled at 115–118°/0.04 mm. Yield, 37.8 g. (62%), $n_D^{26}=1.5101$.

The analytical sample distilled at 114°/0.03 mm., $n_D^{26}=1.5098$.

*Analysis.*—Calculated for $C_9H_{11}ClO$: C, 63.35; H, 6.50. Found: C, 63.67; H, 6.92.

The infrared spectrum showed the expected bands for —OH, and —C≡C—. There was very little allenic absorption at 5.15 microns.

(b) *From propargyl alcohol.*—A 2-liter reaction flask equipped as indicated in (a) was charged with 285 cc. of preformed ethereal ethyl magnesium bromide containing 0.42 M of reagent. After dilution by the careful addition of 135 cc. of tetrahydrofuran, the solution was cooled in an ice bath and a solution of 11.2 g. (0.2 M) of propargyl alcohol in 140 cc. of tetrahydrofuran was added over 35 minutes. The reaction was vigorous. Additonal tetrahydrofuran (70 cc.) was added and the mixture was stirred and refluxed for two hours. The resulting clear solution was cooled and 0.4 g. of cuprous chloride was added. After stirring and refluxing for 15 minutes, a solution of 37 g. (0.19 M) of 1-bromo-6-chloro-2-hexyne in 70 cc. of tetrahydrofuran was added to the warm solution over 20 minutes. The mixture was stirred and refluxed for a total of 44 hours (an extra 0.4 g. portion of cuprous chloride was added after 19 hours). After cooling (under nitrogen), the reaction mixture was diluted with 270 cc. of saturated ammonium chloride solution, followed by 350 cc. of ether, and the apparatus was transferred to a nitrogen atmosphere for the work up. The solid was filtered through a mat of filter aid (Hyflo) supported on a coarse sintered glass funnel, the organic layer was washed with three 150 cc. portions of saturated sodium chloride solution and finally, after drying over sodium sulfate, the solvent was stripped in vacuo. Distillation in vacuo through a 4" Vigreux column gave a main cut of material boiling at 111–114°/0.04 mm. Yield 16.7 g. (52%), $n_D^{26}=1.5120$.

EXAMPLE 5

1-bromo-9-chloro-2,5-nonadiyne (VI)

A 500 cc. flask fitted with a stirrer, thermometer, pressure-equalizing dropping funnel and a calcium chloride tube, connected to a line supplying dry nitrogen under a low pressure, was charged with a solution of 40.7 g. (0.24 M) of 1-hydroxy-9-chloro-2,5-nonadiyne in 110 cc. of anhydrous ether containing 3.6 cc. of pyridine. The solution was cooled to 0° and, over a period of 20 minutes, a solution of 23.9 g. (8.4 cc., 0.089 M) of phosphorus tribromide in 45 cc. of anhydrous ether was added. A white precipitate separated. The temperature was maintained at 0° during the addition and for one hour longer. Then the temperature was allowed to rise to 20° over a 45 minute period and this temperature was maintained for 1½ hours after which time it was dropped to 0°. Ice water (175 cc.) was added and the work up was continued in a nitrogen atmosphere. The ether layer was washed twice with 50 cc. of 5% sodium carbonate solution followed by two 50 cc. portions of 10% sodium chloride solution. After drying over sodium sulfate, the ether was stripped off in vacuo and the residue was distilled, under nitrogen, through a 6" Vigreux column. The product, 1-bromo-9-chloro-2,5-nonadiyne, distilled as a pale yellowish oil at 93–96°/0.06 mm. Yield, 30.1 g. (54%), $n_D^{26}=1.5381$. A short forerun and a short afterrun were discarded.

The analytical sample distilled at 84°/0.04 mm., $n_D^{26}=1.5381$.

*Analysis.*—Calculated for $C_9H_{10}ClBr$: C, 46.28; H, 4.32. Found: C, 46.58; H, 4.28.

The infrared spectrum showed the usual acetylenic peaks around 4.5 microns and practically no allenic absorption at 5.15 microns.

EXAMPLE 6

1,4-decadiyne (VIII)

Ethyl magnesium bromide was prepared in a one liter flask by adding 107 g. (76 cc., 0.98 M) of ethyl bromide in 100 cc. of anhydrous ether to a suspension of 19.5 g. (0.81 M) of magnesium turnings in 300 cc. of anhydrous ether at a rate such that a steady reflux was maintained. This operation required 45 minutes, after which time the reaction mixture was stirred and refluxed for an additional period of 20 minutes. After being cooled to room temperature, the Grignard solution was decanted, in a nitrogen atmosphere, through a loose plug of glass wool directly into a 2-liter reaction flask. This flask was provided with a precision ground stirrer, a pressure equalizing dropping funnel and a condenser connected at the top through a calcium chloride tube to a line supplying dry nitrogen under a small pressure. A solution of 94 g. (0.98 M) of 1-heptyne (VII) in 75 cc. of anhydrous ether was added to the stirred ethyl magnesium bromide solution over a 30 minute period. Refluxing, which began spontaneously after the addition was about half finished, was maintained by external heating for one hour after all of the 1-heptyne had been added. Cuprous chloride (2.5 g., 0.025 M) was added and the mixture was boiled for 15 minutes longer. Finally, over a 12 hour period, 77.0 g. (51 cc., 0.65 M) of propargyl bromide was added to the gently refluxing reaction mixture. Stirring and refluxing were continued for an additional 60 hours, during which interval two distinct layers appeared.

After being cooled with an ice bath under a nitrogen blanket, 250 cc. of ice cold 5 N sulfuric acid and 125 cc. of ether were added, with good stirring, from a dropping funnel and the solid matter was removed by suction filtration through a coarse sintered glass funnel which was coated with a mat of filter aid (Hyflo). This and all subsequent operations in this example were carried out in a nitrogen atmosphere. The filter cake was washed with ether and the aqueous layer was separated from the two-phase filtrate. The organic layer was washed successively, twice with 60 cc. of water, once with 60 cc. of 5% sodium bicarbonate solution and twice with 60 cc. of water. After drying over sodium sulfate, the ether was stripped off at 40° in a partial vacuum and the product, 1,4-decadiyne, was distilled under nitrogen from an oversized flask through a 10″ Vigreux column into ice-cooled receivers. After a short forerun, the vacuum improved to 12 mm. and the main cut distilled at 75–77° as a colorless mobile liquid. Yield, 56 g. (64.5%); $n_D^{24.5}=1.4532$. The material becomes yellowish immediately on exposure to air.

The analytical sample distilled at 104°/50 mm.; $n_D^{24.5}=1.4515$.

*Analysis.*—Calculated for $C_{10}H_{14}$: C, 89.49; H, 10.51. Found: C, 89.54; H, 10.21.

The infrared spectrum showed the expected peaks: 3.05 microns (—C≡CH) and the usual cluster of peaks around 4.5 microns (—C≡C—). There was also a small peak at 5.15 microns, attributable to allenic impurity. Redistillation after heating for 4½ hours at 180° resulted in a 70% recovery of material free of allenic impurity (no peak at 5.15 microns).

EXAMPLE 7

*1-chloro-4,7,10,13-nonadecatetrayne (IX)*

Ethyl magnesium bromide, prepared from 1.41 g. (0.058 M) of magnesium turnings and 7.4 g. (5.2 cc., 0.068 M) of ethyl bromide in 50 cc. of anhydrous ether, was decanted, in a nitrogen atmosphere, through a loose plug of glass wool directly into a 500 cc. reaction flask. This flask was equipped with a precision ground stirrer, a pressure equalizing dropping funnel and a condenser, connected at the top, through a calcium chloride tube, to a line supplying dry nitrogen under a small pressure. A solution of 8.7 g. (0.065 M) of 1,4-decadiyne in 25 cc. of anhydrous ether was added over 30 minutes, and the mixture was stirred and refluxed for one hour. Cuprous chloride (0.25 g.) was then added and, after 15 minutes, a solution of 10.2 g. (0.044 M) of 1-bromo-9-chloro-2,5-nonadiyne in 26 cc. of anhydrous ether was added to the refluxing reaction mixture over 10 minutes. The nitrogen blanket was removed and stirring and refluxing were continued for 69 hours during which time a heavy yellow precipitate had formed. Nitrogen was introduced into the system and, after cooling with an ice bath, 75 cc. of iced 2 N $H_2SO_4$ was added and the mixture was stirred until the two phases were clear. The work up was continued in a nitrogen atmosphere. The ether layer was washed twice with 50 cc. of water, then with 25 cc. of a 5% sodium bicarbonate solution and finally twice with 50 cc. of water. After drying over sodium sulfate, the ether was stripped off and the residue was distilled through a short distilling head without introducing a gaseous ebullient. When full water pump vacuum could be applied, 2.7 g. of colorless liquid (recovered 1,4-decadiyne) distilled at 68–78°/12 mm. and was collected in a receiver which was packed in Dry Ice, $n_D^{26}=1.4531$. The distillation was then continued in high vacuum and, after taking a short forerun, the main cut distilled as a tan colored oil from 140–160°/<0.001 mm. This oil, dissolved in 20 cc. of petroleum ether (30–60°) was filtered through 40 g. of Woelm alumina (neutral), which was packed dry in a short column, and washed through with 200 cc. of fresh petroleum ether. The solvent was stripped in vacuo and the product, 1-chloro-4,7,10,13-nonadecatetrayne, was distilled through a 4″ Vigreux column as a pale yellow oil, B.P. 130–137°/<0.001 mm. Yield 3.8 g. (30%), $n_D^{25}=1.5084$.

The analytical sample distilled at 135°/<0.001 mm., $n_D^{25}=1.5053$.

*Analysis.*—Calculated for $C_{19}H_{23}Cl$: C, 79.56; H, 8.08. Found: C, 79.36; H, 8.52.

The ultraviolet absorption spectrum in isopropanol showed a maximum at 270 mµ, ε=724. The infrared spectrum showed the usual cluster of peaks around 4.5 microns (—C≡C—) and no peak at 5.15 microns (allene). The material darkens rapidly on exposure to air and soon turns to a dark resin. Material stored in a glass stoppered flask, packed in Dry Ice for four months (crystalline at this temperature), was distilled to give a 70% recovery. On hydrogenation in ethyl acetate with Adams catalyst, the theoretical amount of hydrogen corresponding to four triple bonds was absorbed. The resulting 1-chlorononadecane was carboxylated (via the nitrile) and the product was identified as arachidic acid by mixed melting point and comparison of the infrared spectrum with that of an authentic sample.

EXAMPLE 8

*1-chloro-4,7,10,13-nonadecatetraene (X)*

(*a*) A solution of 2.77 g. (0.0097 M) 1-chloro-4,7,10,13-nonadecatetrayne in 80 cc. of Skellysolve B (purified by shaking four times with concentrated sulfuric acid and then washing with water, sodium carbonate solution and finally water, drying over sodium sulfate and distilling), containing a suspension of 2.0 g. of 5% Pd Lindlar catalyst [Helv. Chim. Acta 35, 450 (1952)], was shaken at room temperature in the presence of hydrogen. The reaction was interrupted after 900 cc. of hydrogen at 25°/760 mm. (95% of theory for the formation of four double bonds) had been absorbed. At this point the rate of hydrogenation had decreased greatly. The catalyst was filtered in a nitrogen atmosphere and after stripping the solvent in vacuo, the product, crude 1-chloro-4,7,10,13-nonadecatetraene, was obtained as an orange oil. Yield 2.5 g. This crude material was converted to arachidonic acid.

(*b*) In another experiment, 1.41 g. (0.0049 M) of 1-chloro-4,7,10,13-nonadecatetrayne was hydrogenated using 1.5 g. of 5% Pd Lindlar catalyst and 60 cc. of purified Skellysolve B. The reaction was interrupted after 25 minutes, when 460 cc. of hydrogen at 25°/760 mm. (96% of theory for the formation of four double bonds) had been absorbed. After filtering the catalyst and stripping the solvent, the product was distilled through a 4″ Vigreux column to give 1.0 g. (69%) of pure 1-chloro-4,7,10,13-nonadecatetraene as a very pale yellow oil, B.P. 96–98°/<0.001 mm., $n_D^{20}=1.4871$.

*Analysis.*—Calculated for $C_{19}H_{31}Cl$: C, 77.38; H, 10.70. Found: C, 77.56; H, 11.14.

The infrared spectrum indicated the absence of triple bonds, a small peak at 10.3 microns indicated the presence of some trans double bonds. The ultraviolet absorption spectrum in isopropanol showed a shoulder from 225–230 mµ (ε=380) and inflection at 260–270 mµ (ε=100).

EXAMPLE 9

*Arachidonic acid (XI)*

(All-cis-5,8,11,14-eicosatetraenoic acid)

Ethyl magnesium bromide was prepared in a 100 cc. flask, equipped with the usual accessories, from 1.09 g. (0.77 cc., 0.01 M) of ethyl bromide, 0.47 g. (0.0194 M) of magnesium turnings and 25 cc. of anhydrous ether. Then, under nitrogen, a solution of 2.5 g. (0.0085 M) of crude 1-chloro-4,7,10,13-nonadecatetraene (from Example 8) in 20 cc. of anhydrous ether was added over 15 minutes to the ethyl magnesium bromide and the remaining magnesium. The nitrogen flow was stopped, and the reaction mixture was stirred and refluxed for 18 hours, after which time only a small amount of magnesium remained. Then, in a nitrogen atmosphere the reaction mixture was poured onto a slurry of 75 g. of powdered Dry Ice in 100 cc. of ether. The mixture was stirred until the temperature had reached about 10°. Then 50 cc. of saturated ammonium chloride solution was added and the mixture was shaken with just enough water to dissolve the solids and give two clear phases. The ether layer was washed with four 30 cc. portions of iced water. After drying over sodium sulfate, the ether was stripped in vacuo and the product, essentially arachidonic acid, was obtained as an orange, unpleasant-smelling oil.

EXAMPLE 10

Methyl arachidonate (XII)

(All-cis-methyl-5,8,11,14-eicosatetraenoate)

The arachidonic acid from Example 9, dissolved in 50 cc. of ether, was added to 60 cc. of 0.34 M diazomethane in ether (0.02 M of diazomethane) and the solution was allowed to stand at 0°, under nitrogen, for 20 hours. After being evaporated in vacuo, the residue was dissolved in 100 cc. of ether, a small amount of gelatinous matter was filtered, and after stripping the solvent in vacuo, the residue was distilled through a 4″ Vigreux column at <0.001 mm. pressure. The main product, total yield 1.5 g. (45% based on 1-chloro-4,7,10,13-nonadecatrayne), was taken as a series of cuts which boiled mainly from 113–118° and had refractive indices which ranged from 1.4797 to 1.4810 at 20°. (The tail fraction, consisting of about 10% of the total, distilled at 126°, no doubt a reflection of the higher bath temperature, and had $n_D^{20}$=1.4797.) All the cuts were only faintly yellow and had an unpleasant odor.

The cut, B.P. 116–118°/<0.001 mm., $n_D^{20}$=1.4806, was selected for microanalysis, spectral examination and hydrogenation with the following results:

*Analysis.*—Calculated for $C_{21}H_{34}O_2$: C, 79.19; H, 10.76. Found: C, 79.60; H, 11.17.

I.R.: 5.76 microns (ester); 6.05 microns (isolated —CH=CH—); 10.3 microns (some trans —CH=CH—)

U.V. (in isopropanol): $E_{max}$ at 233–234 m$\mu$ ($\epsilon$=815) and poorly defined maxima or inflections at 264–265 m$\mu$ ($\epsilon$=235); 273.4 m$\mu$ ($\epsilon$=230) and 318 m$\mu$ ($\epsilon$=0.60).

Hydrogenation (Pt, $CH_3OH$): 240 mg., M.W. 318.6, requires 7.36 cc. at 25°/760 mm. for four double bonds. Actual uptake=74.2 cc. at 25°/760 mm.

M.P. of hydrogenation product (A)=42°.
M.P of authentic methyl arachidate (B)=45°.
Mixed M.P. (A)+(B)=42–45°.

We claim:
1. 1-chloro-4,7,10,13-nonadecatrayne.
2. 1-chloro-4,7,10,13-nonadecatetraene.
3. 1-bromo-9-chloro-2,5-nonadiyne.
4. 1-hydroxy-9-chloro-2,5-nonadiyne.
5. 1-bromo-6-chloro-2-hexyne.
6. 1-hydroxy-6-chloro-2-hexyne.

References Cited in the file of this patent

UNITED STATES PATENTS 2,855,441    Sondheimer   ------------ Oct. 7, 1958

OTHER REFERENCES

Nieuwland: The Chemistry of Acetylene (1945), pp. 46, 74 and 95 to 98.

Johnson: Acetylenic Compounds (1946), p. 62.

Wagnet et al.: Synthetic Organic Chemistry (1953), pp. 46 and 424.

Raphael: Acetylenic Compounds in Organic Synthesis (1955), pp. 15 to 17.

UNITED STATES PATENT OFFICE
CERTIFICATE OF CORRECTION

Patent No. 2,934,570                                           April 26, 1960

Moses Wolf Goldberg et al.

It is hereby certified that error appears in the printed specification of the above numbered patent requiring correction and that the said Letters Patent should read as corrected below.

Column 3, line 12, for "1-tetrahydro-2-" read -- 1-(tetrahydro-2- --; column 6, line 53, for "dropped at" read -- dropped to --; line 63, for "was discarded" read -- were discarded --; column 9, line 59, for "68-78°" read -- 68-70° --; column 10, line 19, for "(0.0097 M) 1-chloro-" read -- (0.0097 M) of 1-chloro- --; line 47, for "H." read -- $H_1$ --; column 11, line 30, for "micronanlysis" read -- microanalysis --; column 12, line 9, for "7.36 cc." read -- 73.6 cc. --; line 30, list of references cited, under "OTHER REFERENCES", for "Wagnet et al." read -- Wagner et al. --.

Signed and sealed this 18th day of October 1960.

(SEAL)
Attest:
KARL H. AXLINE
Attesting Officer

ROBERT C. WATSON
                                        Commissioner of Patents